Aug. 12, 1969  C. T. MATHERS  3,460,634
LAMINATED SHANK
Filed Sept. 26, 1966  2 Sheets-Sheet 1
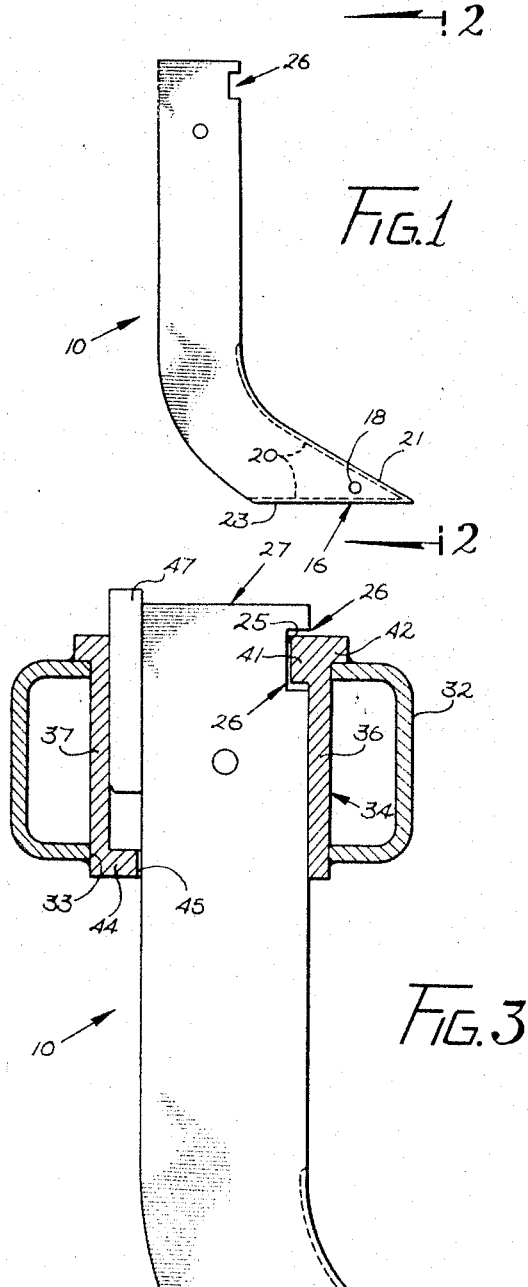
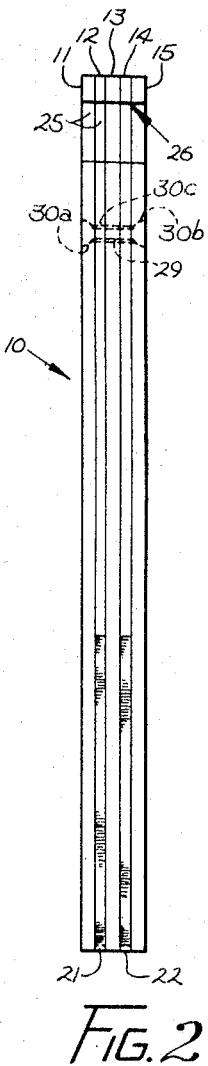
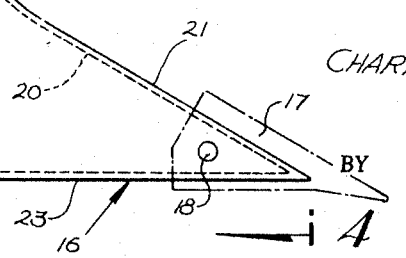
CHARLES T. MATHERS
INVENTOR.
BY
R.E. Geauque
ATTORNEY Aug. 12, 1969  C. T. MATHERS  3,460,634
LAMINATED SHANK Filed Sept. 26, 1966  2 Sheets-Sheet 2

CHARLES T. MATHERS
INVENTOR.

BY R. E. Granger
ATTORNEY

3,460,634
LAMINATED SHANK

Charles T. Mathers, Long Beach, Calif., assignor to Rheem Manufacturing Company, New York, N.Y., a corporation of California
Filed Sept. 26, 1966, Ser. No. 581,833
Int. Cl. A01b 33/10, 35/20, 39/22
U.S. Cl. 172—708                                      4 Claims

ABSTRACT OF THE DISCLOSURE

The laminated shank for supporting excavation teeth of this invention comprises a shank produced from a plurality of pieces of steel of like shape and length which are joined in side-by-side relationship only at their lower ends and the remainder of the steel plates are unjoined and thereby permit relative deflection when subjected to side or lateral forces.

---

This invention relates to a laminated shank for excavation teeth and more particularly to a laminated shank having flexibility under side stress.

Ripper and scarifier have been fabricated from a single piece of metal with the lower end shaped to snugly receive a tooth and the upper end notched for attachment to a support bar carried by the moving vehicle. The thickness of the single piece shank must be greater enough to withstand the head-on loads and because of its thickness, the shank losses flexibility in the side direction under side stresses. Thus, in most cases, the single shank fails under side stress, usually at a point adjacent the supporting bar where maximum side stress develops.

The present invention provides a laminated shank which comprises a plurality of plates placed side by side and attached together so that the plates can move relative to one another and individually deflect sideways under side stress. The individual plates that make up the shank are in the plane of movement of the teeth and therefore, the teeth combine to resist the head-on loads. However, since the individual plates of the lamination shank are thinner than the single plate used in prior construction for the same head-on strength, the laminated shank has greater resistance to side stress and more side deflection can take place without failure or permanent set. Also, when the individual plates of the laminated shank are connected only at one end, the laminated shank absorbs side stress in the same manner as a leaf spring and each plate deflects to the side independently of the others to provide greater side deflection without failure.

It is therefore an object of the present invention to provide a laminated shank which has excellent resistance to side stress.

Another object of the present invention is to provide a laminated shank having greater resistance to side stress than a single shank capable of resisting the same head-on load.

These and other objects of the invention not specifically set forth above will become readily apparent from the accompanying description and drawings in which:

FIGURE 1 is a side elevational view of a laminated shank showing the individual plates welded together at the lower end;

FIGURE 2 is an edge elevational view along line 2—2 of FIGURE 1;

FIGURE 3 is a side elevational view similar to FIGURE 1 showing the shank connected to the supporting bar at its upper end and to a tooth at its lower end;

Figure 4:
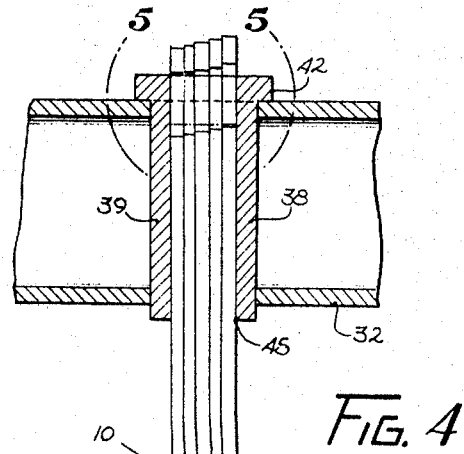
FIGURE 4 is an edge elevational view along line 4—4 of FIGURE 3 illustrating the laminated shank in deflected position.

Referring to the embodiment of the invention shown in FIGURES 1–5, the shank 10 is comprised of five flat plates 11–15 which have generally the same shape and are placed side by side to form the shank. The lower end 16 of the shank is shaped to snugly receive a ripper tooth 17 (see FIGURE 3) and the tooth is secured in a well known manner to the shank by a pin 18 passing through an opening in the shank. Plates 12 and 14 have lower edge surfaces following the dotted line 20 of FIGURE 1 so that when the plates are placed together, two recesses are formed and these recesses are filled with weld metal 21 and 22 in order to rigidly secure the plates together at their lower ends. The weld metal is smoothed so that the weld metal is in the same surface as the lower edges 23 of the plates 11, 13 and 15.

Each of the plates 11–15 contains a rectangular, edge recess 25 at its upper end and the recesses are all aligned to produce a continuing notch 26 in the shank at its upper end 27. Also, each of the plates contain an opening in its upper end to receive a pin 29 which serves solely to hold the plates against one another at the upper end. The openings 30a and 30b in plates 11 and 15 are circularly countersunk to receive the headed ends of pin 29 and the circular openings 30c in plates 12, 13 and 14 are greater in diameter than the shank of pin 29.

The shank 10 is connected to a supporting bar 32 which in turn is carried by the vehicle which provides the power for moving the teeth 17. The bar 32 is rectangular and hollow and has an opening 33 for each of the shanks secured thereto. A rectangular, hollow member 34 is located in each opening 33 with its sides 36–39 located adjacent the edges of opening 33, and the sides are secured to these edges by welding. Side 36 has an inwardly projecting flange 41, and a top collar 42 is located on top of this flange and on the top edge of the other sides to engage the top surface of bar 32. The lower edge of side 33 also has an inwardly projecting flange 44, and the distance between the inner edge of flange 44 and side 36 corresponds to the width of the shank 10 in order to form a bottom opening 45 for receiving the shank.

In order to assemble the shank, it is inserted through opening 45 and cocked so that the notch 26 can receive the inner edge of flange 41 and the inner edge of collar 42 above flange 41. Thereafter, a wedge 47 is inserted between side 37 of member 34 and the back edge of the shank in order to lock the shank in supporting bar 32. The width of each plate from leading to trailing edge is such as to withstand the head-on loads. Also, the thickness of each plate is selected so that the combined sidewise bending strength will resist the side stress on the shank.

Figure 5:
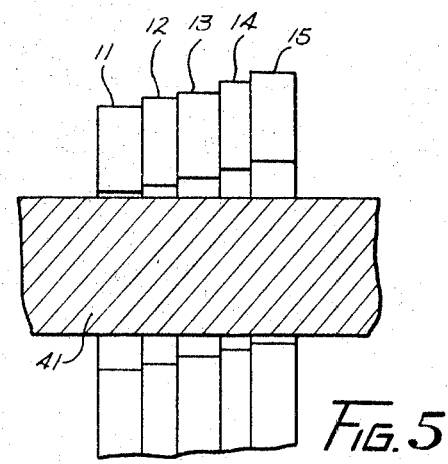
FIGURE 5 is an enlarged sectional view of area 5 of FIGURE 4.

Referring to FIGURE 4, a deflected position of the shank under side loading is illustrated. Since the plates are connected together only at the lower portion of the shank, the plates will move relative to one another during deflection. Therefore, the top ends of the plates will assume a stepped relationship as shown in FIGURE 5 after being deflected. The notch 26 is wider than the combined height of the flange 41 and collar 42 in order to provide clearance for the relative movement, and the clearance between openings 30c and the pin 29 is sufficient to permit the relative movement since the headed ends of the pin can rotate in countersunk openings 30a and 30b.

The shank absorbs side stress in much the same manner as a leaf spring. The plates 11–15 can all have the same thickness or the plates can be of different thicknesses. It is only necessary that the combined shank thickness provide a lower end which will fit into the interior of a tooth 17. Each plate must be thick enough to withstand head-on loads and the thinner the plate, the more it can deflect without failure. In general, the shank can consist of two or more plates each of thickness at least great enough to withstand head-on loads and having a combined thickness great enough to withstand side loads.

Figure 6:
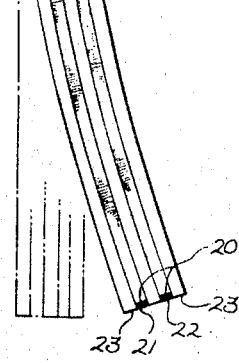
FIGURE 6 is an edge elevational view of a second form of the invention in which the individual plates are secured together by a pliable adhesive.

A modification of the invention, illustrated in FIGURE 6, consists of a shank 50 comprising a plurality of plates 51 which are identical in shape and are connected together by layers 52 of a pliable adhesive. The amount of surface coverage and thickness of the adhesive will depend upon its strength and pliability. The overall shape of shank 50 can be the same as shank 10.

Figure 7:
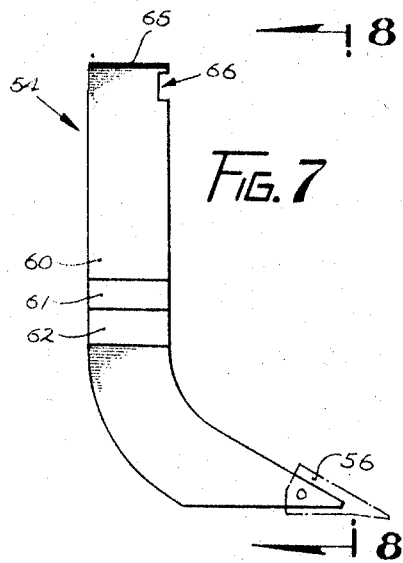
FIGURE 7 is a side elevational view of another form of the invention in which the tooth is supported only by the center plate.
Figure 8:
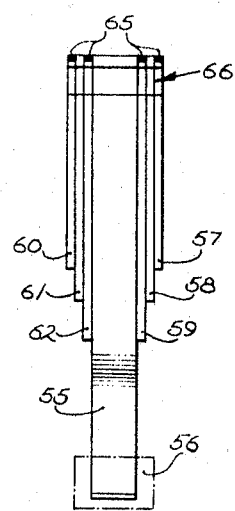
FIGURE 8 is an edge elevational view along line 8—8 of FIGURE 7.

Another modification of the invention, illustrated in FIGURES 7 and 8, consists of a shank 54 comprising a central plate 55 having a lower end shaped to be inserted into the opening in tooth 56. Three spring plates 57–59 of progressively increasing length are located on one side of plate 55 and three spring plates 60–62 are located on the opposite side of plate 55 and correspond in length to plates 57–59, respectively. The top edge of plates 57, 59, 62 and 60 are below the top edge of plates 55, 58 and 61 to provide for spaces to receive weld metal which rigidly secures the plates together at their top end. All of the plates have aligned notches to form the shank notch 66 which is utilized to attach the shank 54 to the supporting bar 32 in the same maner as shank 10.

The single plate 55 has a thickness which will resist head-on loads but not maximum side loads. Since failure of a shank under side loads usually occurs adjacent the supporting bar, the side plates 57–62 are located in this region to provide added resistance to side loads. Below the side plates, the central plate 55 can deflect sufficiently to prevent failure under side stress. All of the plates can bend separately to provide flexibility under side loading.

While the instant invention has been shown and described in what is conceived to be practical and preferred embodiments, it is recognized that departures may be made therefrom in the scope of the invention, which is therefore not to be limited to the details disclosed herein, but is to be afforded the full scope of the claims.

What is claimed is:

1. A laminated shank for supporting a removable excavating tooth comprising a plurality of like pieces of steel plate joined in fixed side-by-side relationship only at their lower ends, said plates being formed at their lower ends to receive and support an excavating tooth, the remainder of said plates unjoined and thereby permitting relative movement between the plates when subjected to lateral forces, means on the upper end of said shank for supporting the shank from a supporting means and said shank supporting means being in such relationship to the shank that permits relative longitudinal movement between the plates when the shank is laterally deflected.

2. A laminated shank as defined in claim 1 wherein said connecting means comprise a notch extending transversely of said plates at their upper ends and receiving an element of said supporting means, said notch being wider than said element to permit said relative movement.

3. A laminated shank as defined in claim 1 having a pin passing through said plates at their upper ends to hold said plates adjacent one another while permitting said relative movement.

4. A laminated shank as defined in claim 1 wherein said plates are secured together by a pliable adhesive between the plates.

References Cited

UNITED STATES PATENTS

| 1,992,313 | 2/1935 | Langley | 172—708 |
| 3,097,004 | 7/1963 | Wenzel | 172—744 X |

ANTONIO F. GUIDA, Primary Examiner

RONALD C. HARRINGTON, Assistant Examiner